United States Patent
Ha et al.

(10) Patent No.: US 9,631,311 B2
(45) Date of Patent: Apr. 25, 2017

(54) WASHING MACHINE CONTROL USING A TAG UNIT TO COMMUNICATE MODEL INFORMATION TO A MOBILE DEVICE

(71) Applicant: LG Electronics Inc., Seoul (KR)

(72) Inventors: Mikyung Ha, Kyungsangnam-do (KR); Junpil Park, Kyungsangnam-do (KR); Byunggee Sung, Kyungsangnam-do (KR)

(73) Assignee: LG Electronics Inc., Seoul (KR)

( * ) Notice: Subject to any disclaimer, the term of this patent is extended or adjusted under 35 U.S.C. 154(b) by 402 days.

(21) Appl. No.: 14/247,426

(22) Filed: Apr. 8, 2014

(65) Prior Publication Data

US 2014/0303783 A1 Oct. 9, 2014

(30) Foreign Application Priority Data

Apr. 9, 2013 (KR) ........................ 10-2013-0038786

(51) Int. Cl.
*D06F 39/00* (2006.01)
*D06F 33/02* (2006.01)
(Continued)

(52) U.S. Cl.
CPC ............ *D06F 39/005* (2013.01); *D06F 33/02* (2013.01); *H04L 12/282* (2013.01);
(Continued)

(58) Field of Classification Search
None
See application file for complete search history.

(56) References Cited

U.S. PATENT DOCUMENTS 8,498,572 B1 * 7/2013 Schooley ............. H04B 5/0031
340/10.51
8,655,345 B2 * 2/2014 Gold ................... H04M 1/7253
345/173
(Continued)

FOREIGN PATENT DOCUMENTS

DE 103 40 627 A1 4/2005
DE 10 2010 040432 A1 3/2008
(Continued)

OTHER PUBLICATIONS

Lv et al. "A New USB Home Appliances Based on PC and Infrared Remote Control Protocol", 2010 IEEE, pp. 572-575.*
(Continued)

*Primary Examiner* — Van Nguyen
(74) *Attorney, Agent, or Firm* — Fish & Richardson P.C.

(57) ABSTRACT

A washing machine control system includes a tag unit that includes a tag storage unit that stores model information; and a transmitting and receiving unit that transmits the model information based on a mobile device being tagged. The washing machine control system further includes a mobile device that includes a tag communication module that receives the model information based on being tagged by the tag unit; an internet module that receives, from a server, information about a plurality of operation courses associated with the model information; a display that displays information; and a control unit that controls the display to display an operation course list comprising the plurality of operation courses.

13 Claims, 12 Drawing Sheets

(51) Int. Cl.
*H04L 12/28* (2006.01)
*D06F 58/28* (2006.01)

(52) U.S. Cl.
CPC .......... *H04L 12/2834* (2013.01); *D06F 58/28* (2013.01); *D06F 2058/2883* (2013.01); *D06F 2202/12* (2013.01); *D06F 2204/10* (2013.01); *D06F 2210/00* (2013.01); *D06F 2214/00* (2013.01); *D06F 2216/00* (2013.01); *H04L 2012/285* (2013.01); *H04L 2012/2841* (2013.01)

(56) References Cited

U.S. PATENT DOCUMENTS

| | | | |
|---|---|---|---|
| 9,137,297 B2* | 9/2015 | Kim | H04L 12/2818 |
| 2002/0095483 A1* | 7/2002 | Lee | D06F 33/02 |
| | | | 709/219 |
| 2005/0050647 A1* | 3/2005 | Tanaka | D06F 39/005 |
| | | | 8/158 |
| 2005/0096760 A1 | 5/2005 | Sturm | |
| 2005/0195751 A1* | 9/2005 | Jones | H04L 12/2859 |
| | | | 370/254 |
| 2007/0200712 A1* | 8/2007 | Arneson | G06K 7/10316 |
| | | | 340/572.8 |
| 2007/0261713 A1* | 11/2007 | Choi | D06F 39/005 |
| | | | 134/18 |
| 2008/0048837 A1 | 2/2008 | Montgomery | |
| 2008/0104768 A1* | 5/2008 | Choi | D06F 33/02 |
| | | | 8/147 |
| 2009/0126123 A1* | 5/2009 | Kim | D06F 33/02 |
| | | | 8/137 |
| 2009/0138107 A1 | 5/2009 | Ha | |
| 2009/0146811 A1* | 6/2009 | Burka | D06F 33/02 |
| | | | 340/572.1 |
| 2012/0093141 A1* | 4/2012 | Imes | F24F 11/0086 |
| | | | 370/338 |
| 2012/0110747 A1* | 5/2012 | Yum | A47L 15/0063 |
| | | | 8/137 |
| 2013/0052946 A1* | 2/2013 | Chatterjee | H04W 4/008 |
| | | | 455/41.1 |
| 2013/0077809 A1* | 3/2013 | Park | D06F 39/005 |
| | | | 381/332 |
| 2013/0214935 A1* | 8/2013 | Kim | G08C 17/02 |
| | | | 340/870.02 |

FOREIGN PATENT DOCUMENTS

| | | |
|---|---|---|
| DE | 102010040432 A1 | 3/2012 |
| JP | 2005-046418 A | 2/2005 |
| WO | WO 2012/031904 A1 | 3/2012 |
| WO | WO 2013/035213 A1 | 3/2013 |
| WO | WO 2013/035242 A1 | 3/2013 |

OTHER PUBLICATIONS

Meijs et al. "Remote Mobile Control of Home Appliances", 2002 IEEE, pp. 100-101.*
Nishiyama et al. "Combining RFID Tag Reader with Mobile Phone:An Approach to Realize Everyone's Ubiquitous Appliances", 2006 IEEE, pp. 87-90.*
Chen et al. "RFID Based Production and Distribution Management Systems for Home Appliance Industry", 2010 IEEE, pp. 177-182.*
Australian Examination Report dated Apr. 21, 2015 for Australian Application No. 2014201965, 3 Pages.
European Search Report dated Sep. 4, 2014, for European Application No. 14163845.2, 11 pages.

* cited by examiner (a)   (b)

(a)          (b)

WASHING MACHINE CONTROL USING A TAG UNIT TO COMMUNICATE MODEL INFORMATION TO A MOBILE DEVICE

FIELD

The present disclosure relates to a washing machine control system and a method of controlling the same.

BACKGROUND

In general, laundry processing devices include a washing machine, a dryer, and a washing machine having a dryer function.

In order to remove pollutants from the laundry such as clothes and bedding using water and detergent and a mechanical operation, a washing machine is a device that performs a process such as washing, rinsing, and dehydration. Such washing machines are classified into a top load type washing machine of rotating a drum in which the laundry is filled about a vertical axis and a front load type washing machine of rotating a drum in which the laundry is filled about a horizontal axis.

The dryer is a device that dries the laundry to be dried by applying warm air to the laundry to be dried and that injects the laundry to be dried into a rotating drum and that dries the laundry by applying warm wind or cold wind into the drum.

The washing machine having a dryer function has both a washing function and a dry function and is a device that injects the laundry such as clothes into a rotating drum and that selects a desired function and that performs washing or drying.

Nowadays, in order to easily perform use and diagnosis of the washing machine, a method of providing a guide is important. A discussion on a method of easily using and diagnosing the washing machine using a mobile device in which a user carries regardless of a model of the washing machine is requested.

SUMMARY

According to an innovative aspect of the subject matter described in this specification may be embodied in a washing machine control system that includes a washing machine that includes a tag unit that includes a tag storage unit that stores model information; and a transmitting and receiving unit that transmits the model information based on a mobile device being tagged; and a mobile device that includes a tag communication module that receives the model information based on being tagged by the tag unit; an internet module that receives, from a server, information about a plurality of operation courses associated with the model information; a display that displays information; and a control unit that controls the display to display an operation course list comprising the plurality of operation courses.

These and other embodiments can each optionally include one or more of the following features. The mobile device further includes input unit that enables selection of at least one of the plurality of operation courses in the operation course list. The control unit controls the display to display a request to tag the tag communication module with the tag unit in response to at least one of the plurality of operation courses being selected. The control unit transmits information about the selected operation course to the washing machine in response to the tag communication module being tagged with the tag unit.

The washing machine further includes an output device that outputs an indication that the information about the operation course has been received in response to the tag unit receiving information about the operation course. The washing machine performs an action based on the information about the operation course in response to the tag unit receiving information about a selected operation course. The display displays a description of a selected operation course. The mobile device further comprises a speaker that outputs a sound signal in response to the tag communication module being tagged by the tag unit.

The display displays an indication that the tag unit and the tag communication module are communicating. The model information includes at least one of a production company, a model name of the washing machine, or information on whether the washing machine is able to communicate. The washing machine control system further includes a controller that determines that information about an operation course has been stored at the tag storage unit based on the washing machine being turned on. The control unit determines to receive the operation course list from the server based on the model information.

According to another innovative aspect of the subject matter described in this specification may be embodied in a method of controlling a washing machine control system that includes the actions of executing a course selection mode; in response to executing the course selection mode, determining that a tag communication module is activated; receiving model information representing a model of a washing machine by tagging the washing machine; connecting to a server; in response to connecting to the server, receiving information about a plurality of operation courses associated with the model information from the server; and displaying an operation course list comprising the plurality of operation courses.

These and other embodiments can each optionally include one or more of the following features. The actions further include receiving a selection of at least one of the plurality of operation courses; and displaying a request to tag the washing machine in response to the at least one of the plurality of operation courses being selected. The action of receiving selection of the at least one of the plurality of operation courses includes displaying a description of the selected operation course in response to the at least one of the plurality of operation courses being selected. The actions further include of transmitting information about the selected operation course to the washing machine.

The actions further include receiving, by the washing machine, information about a selected operation course of the plurality of operation courses and performing a washing operation based on information about the operation course. The action of receiving model information includes displaying information about communicating while the model information is received. The model information includes at least one of a production company, a model name of the washing machine, a course presently downloaded in the washing machine, or information on whether the washing machine is able to communicate. The action of receiving model information includes determining to receive the operation course list from the server based on the model information.

DETAILED DESCRIPTION

Figure 1:
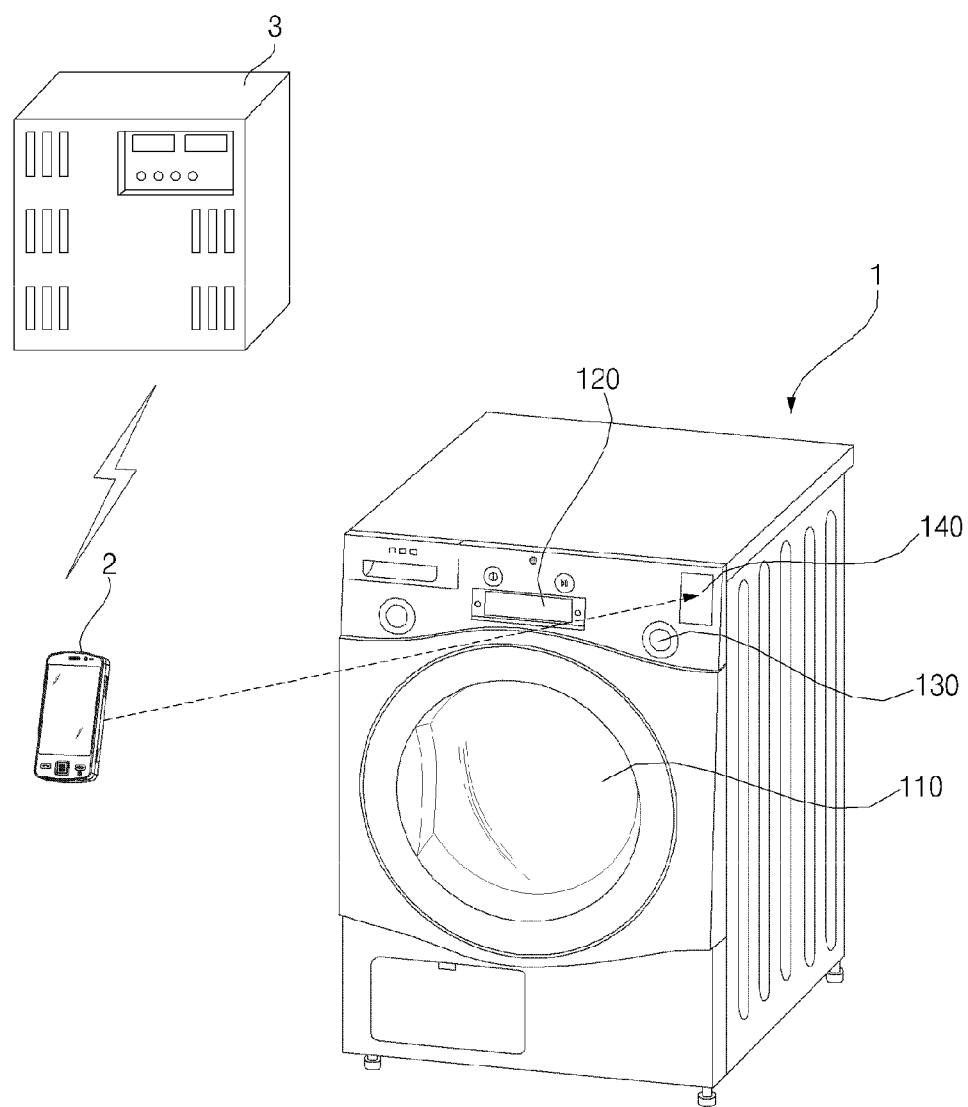
FIG. 1 is a diagram illustrating constituent elements of an example washing machine control system.

FIG. 1 illustrates constituent elements of an example washing machine control system.

Referring to FIG. 1, a washing machine control may include a washing machine 1 including a tag unit including a tag storage unit that stores model information and a transmitting and receiving unit that transmits the model information, when a mobile device is tagged and a mobile device 2 including a tag communication module that receives the model information when being tagged with a tag unit, an Internet module that receives information about a plurality of operation courses matched to the model information from a server, a display that displays various information, and a control unit that controls the display to display an operation course list including the plurality of operation courses.

The washing machine 1 may include a tag unit 140. The tag unit 140 may include a tag storage unit that stores model information, when the mobile device is tagged and a transmitting and receiving unit that transmits model information.

The mobile device 2 may communicate with the washing machine 1. When the mobile device 2 is tagged with the tag unit 140 of the washing machine 1, the mobile device 2 can communicate with the washing machine 1 using a communication device that can perform data communication.

The mobile device 2 may include a display and may receive data from the washing machine 1 and visually displays the data on the display. The mobile device 2 may display an operation course list including a plurality of operation courses corresponding to model information of the washing machine with the display and display an interface in which a user can select an operation course.

When the mobile device 2 receives model information from the washing machine 1, the mobile device 2 may determine whether to execute an operation course mode based on the model information.

The mobile device 2 may communicate with an external server 3. The server 3 may store information about the washing machine 1. The mobile device 2 may request an operation course list corresponding to model information received from the washing machine 1 to the server 3 and receive the operation course list from the server 3. In some implementations, the mobile device 2 and the server 3 may communicate using, for example, an Inter-Integrated Circuit (I2C) bus.

Figure 2:
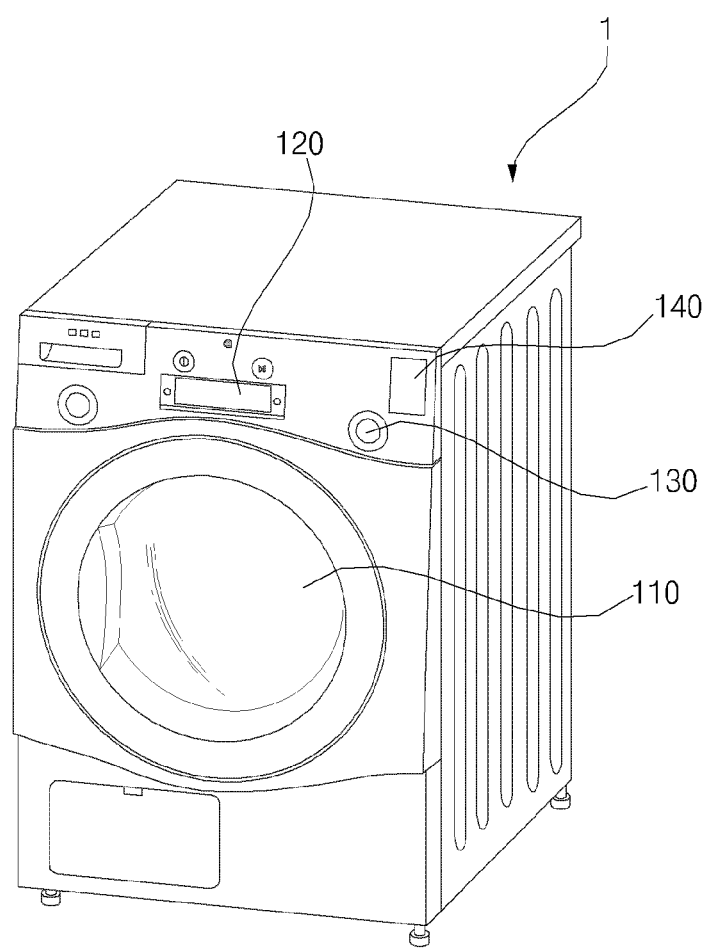
FIG. 2 is a perspective view illustrating a structure of an example washing machine of a washing machine control.

FIG. 2 illustrates a structure of an example washing machine of a washing machine control system.

Referring to FIG. 2, the washing machine 1 may include a case that forms an external appearance and a drum rotatably provided within the case to receive the laundry such as clothes. At an inner circumferential surface of the drum, a lift is provided, and when the drum rotates, the lift may move clothes upward and downward.

The case may have a clothing injection port to be opened to inject the laundry into the drum at the front side. At an upper portion of a front surface of the case, a display device 120, which is one of output units that display various information about an operation state of the washing machine may be disposed. In some implementations, the display device 120 may include a light source such as a Liquid Crystal Display (LCD) and a Light Emitting Diode (LED) that display control information of the washing machine.

In the clothing injection port, a door 110 may be installed. The door 110 may open and close a clothing injection port, which is an inlet that injects the laundry into the drum. The door 110 may be manually manipulated by a user or may be operated by an electronic control. The door 110 may be rotatably connected to the case.

At the front side of the case, at least one button 130 may be disposed. As shown in FIG. 2, the button 130 is a mechanical button to be manipulated by a user's touch, but the button 130 is not limited thereto, and the button 130 may include a touchpad and recognize a touch. The button 130 may correspond to a control that operates the washing machine.

Figure 3:
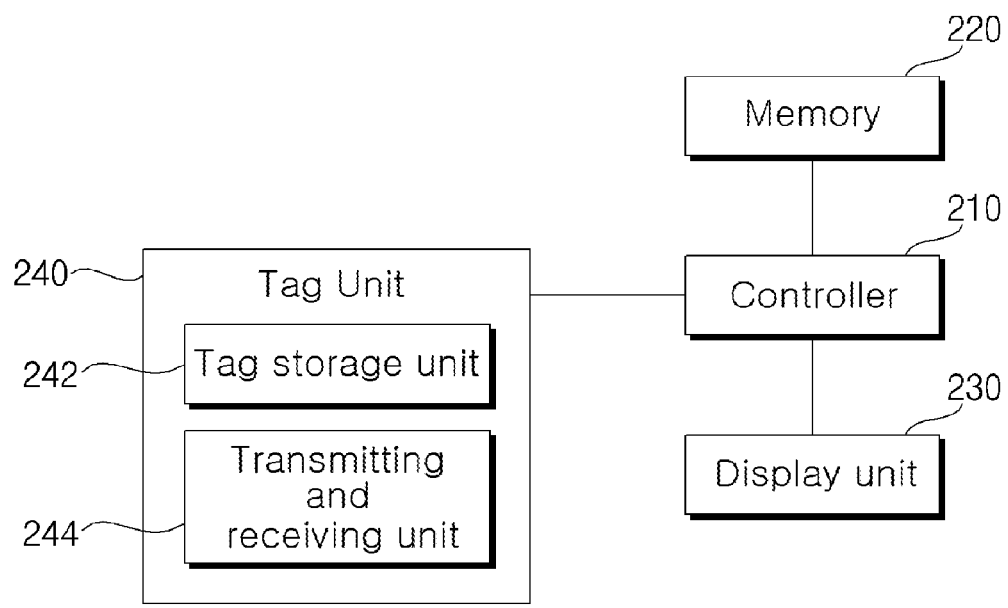
FIG. 3 is a block diagram illustrating constituent elements of an example washing machine of a washing machine control.

FIG. 3 illustrates constituent elements of an example washing machine of a washing machine control system.

Referring to FIG. 3, the washing machine of the washing machine control system may include a tag unit 240 including a tag storage unit 242 that stores model information and a transmitting and receiving unit 244 that transmits model information, when the mobile device is tagged.

A controller 210 may control operation of the washing machine. The controller 210 may transmit and receive a control signal to and from other elements of the washing machine. The controller 210 may transmit a signal to other elements of the washing machine to control the other elements.

In order to process data, the controller 210 may control a display unit 230 to display data stored at a memory 220 or may perform a program stored at the memory 220.

The memory 220 may include a high speed random access memory (RAM). The memory 220 may include a non-volatile memory such as at least one magnetic disk storage device, a flash memory device, or other non-volatile solid phase memory devices. In some implementations, the memory 220 may include a readable storage medium.

In some implementations, the memory 220 may include an Electronically Erasable and Programmable Read Only Memory (EEP-ROM). The EEP-ROM may write and erase information by the controller 210. As power is turned off, even if power supply is stopped, the EEP-ROM may be a storage device that does not erase but maintains information stored therein.

The memory 220 may store various programs or data by interlocking with the controller 210. A program stored in the memory 220 may be executed by the controller 210.

The controller 210 may store model information of the washing machine at the memory 220. The controller 210 may control various operations of the washing machine. When the tag unit 240 receives information about a selected operation course, the washing machine may perform operation based on the information about the received operation course. For example, the controller 210 of the washing machine may perform operation of the washing machine based on an operation course selected by the user, in which the tag unit 240 receives.

When the tag unit 240 and the mobile device perform communication, the controller 210 may determine whether communication is presently performing or whether communication has been appropriately performed. When communication between the mobile device and the washing machine has been appropriately performed, the controller 210 may control the display unit 230 to display that communication between the mobile device and the washing machine has been appropriately performed.

When the tag unit 240 receives information about an operation course, the washing machine may include the display unit 230 representing that information about an operation course has been appropriately received. The display unit 230 may include various means that output a signal, such as a display device that outputs a visual signal and a speaker that outputs an audible signal.

When power of the washing machine is turned on, the controller 210 may determine whether information about an operation course was stored at the tag storage unit 242. When an event occurs according to a constant cycle or when an event occurs, the controller 210 may determine whether the tag unit 240 has received information about an operation course from the mobile device.

When the controller 210 may determine that the tag unit 240 has received information about an operation course, the controller 210 may control the washing machine based on the received information about an operation course.

The tag unit 240 may store model information at the tag storage unit 242. The model information may be information about identification of the washing machine. The model information may include at least one of a production company, a model name of the washing machine, a course presently downloaded in the washing machine, and information on whether the washing machine can communicate.

The tag unit 240 may communicate with an external device having a module that can perform Near Field Communication (NFC). The external device may be a mobile device including a mobile terminal. The tag unit 240 may communicate with an external device. The tag unit 240 may include the tag storage unit 242 that stores data and the transmitting and receiving unit 244 that communicates with the outside. The tag unit 240 may perform NFC.

The tag unit 240 may store model information of the washing machine 1. The model information may include a production company and a model name of the washing machine and information on whether the washing machine can communicate.

NFC may operate with a simple tag operation. In NFC, data may be processed and transmitted and received with a desired method. NFC can be used in various devices, and when entire terminals including an NFC module correspond to a data specification, data can be synchronized.

NFC can be generally used within a communication distance of less than ten centimeters. Because NFC has a small communication distance, personal information may be less likely to be leaked. When a NFC function is activated, the tag unit 240 may read or write data through a tagged device.

The tag unit 240 may transmit model information to the mobile device. The tag unit 240 may receive information about an operation course from the mobile device. The tag unit 240 may receive a signal of the controller 210 and store and transmit and receive data to correspond thereto.

Figure 4:
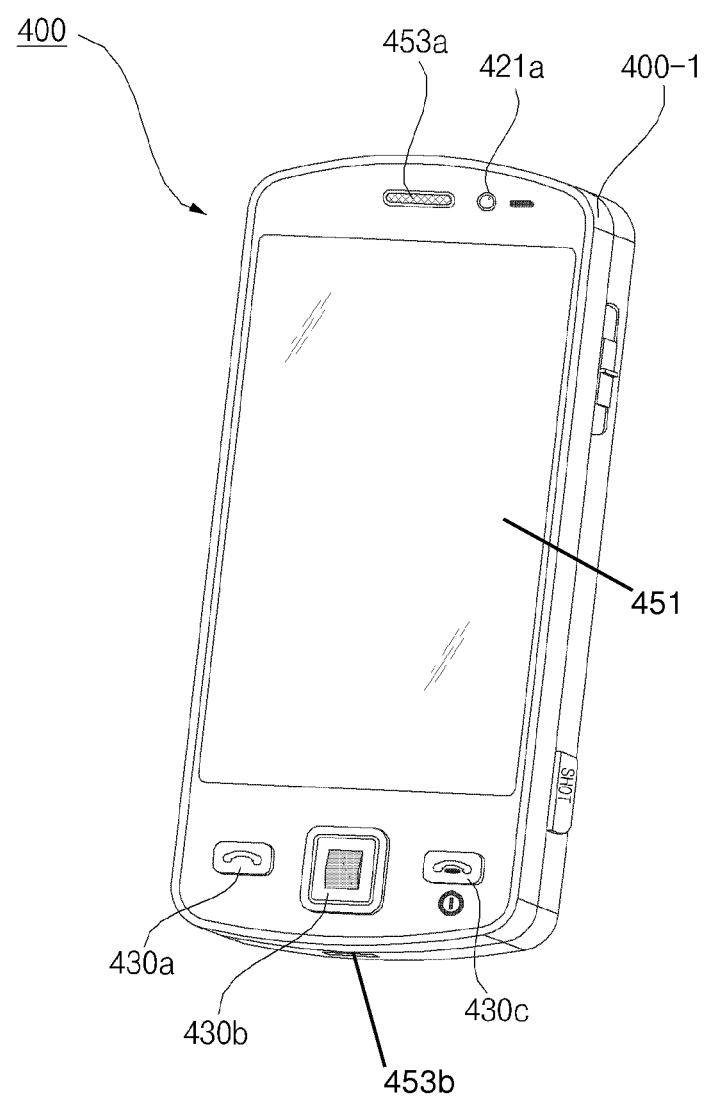
FIG. 4 is a perspective view illustrating a structure of an example mobile device of a washing machine control.

FIG. 4 illustrates a structure of an example mobile device 400 of a washing control system.

The mobile device 400 may be a folding type, a bar type, a swing type, or a slider type of mobile device. FIG. 4 illustrates an example bar type mobile device having a front surface touch screen.

Referring to FIG. 4, the mobile device 400 of the washing control system may include a communication device that receives model information and a display 451 that displays various information, by tagging with a tag unit of the washing machine.

As touch pads are overlapped in a layer structure, a display 451 may operate as a touch screen and input information by a user's touch.

A speaker 453*a* may be provided in a form of a receiver or a speaker. A camera 421*a* may be provided in a form appropriate to photograph an image or a moving picture of a user. A microphone 453*b* may be provided in an appropriate form to receive an input of a user's voice and other sounds.

The mobile device 400 may include at least one input unit. For example, the mobile device 400 may include first to third input buttons 430*a*, 430*b*, and 430*c*. From a functional viewpoint, the first to third input buttons 430*a*, 430*b*, and 430*c* are elements for inputting an instruction such as communication, mouse point movement, screen scrolling, start, and end.

Figure 5:
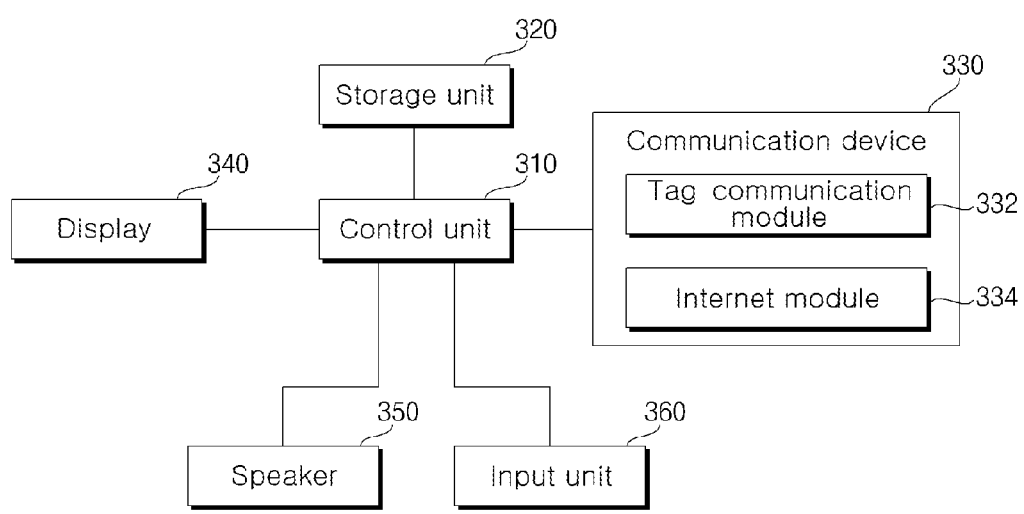
FIG. 5 is a block diagram illustrating constituent elements of an example mobile device of a washing machine control system.

FIG. 5 illustrates constituent elements of an example mobile device of a washing control system.

Referring to FIG. 5, a mobile device of a washing control system may include a control unit 310 that performs various controls, a storage unit 320 that stores various programs or data by interlocking with the control unit 310, a communication device 330 that receives model information from the washing machine, and a display 340 that displays various information.

The control unit 310 may control operation of the mobile device. In order to process data, the control unit 310 may control the display 340 to display data stored at the storage unit 320 or may perform a program stored at the storage unit 320.

The control unit 310 may store model information in which the communication device 330 receives, information about at least one operation course, or an operation course list at the storage unit 320. The control unit 310 may control the display 340 to display model information in which the communication device 330 receives, information about an operation course, or an operation course list.

The control unit 310 may determine whether an operation course selection mode that adjusts an operation course of the washing machine can be performed based on model information in which the communication device 330 receives. For example, the control unit 310 may determine whether a washing machine production company and a washing machine model in which a diagnosis mode supports. The control unit 310 may determine whether the washing machine can perform NFC based on model information and may determine whether a diagnosis mode can be performed.

The control unit 310 may control the display 340 to display an operation course list. The control unit 310 may control the display 340 to display a description of a selected operation course of a plurality of operation courses in which an operation course list includes.

When at least one operation course is selected from the operation course list, the control unit 310 may control the display 340 to display information that requests to tag with the tag unit of the washing machine.

When a tag communication module 332 is tagged with the tag unit of the washing machine, the control unit 310 may control to transmit information about a selected operation course to the tag unit.

The display 340 may display various information. The display 340 may be a means that visually displays information. For example, the display 340 may include at least one of a liquid crystal display (LCD), a thin film transistor-liquid crystal display (TFT-LCD), an organic light-emitting diode (OLED), a flexible display, and a three-dimensional display (3D display).

In some implementations, the display 340 may be more than one display. For example, the mobile device may simultaneously have an external display unit and an internal display unit.

When the tag communication module 332 communicates with the tag unit of the washing machine or is complete communication with the tag unit, the display 340 may display information to correspond thereto. The display 340 provides information about performance or completion of communication to a user, thereby preventing a communication error that may occur when tagging is not appropriately performed.

The display 340 may display an operation course list so that the user can select an operation course to operate the washing machine. The display 340 may display a description of the selected operation course. The operation course list may be a list of a plurality of operation courses, which are operation methods of the washing machine.

The mobile device may further include an input unit 360 that can select at least one of a plurality of operation courses in which the operation course list includes. The input unit 360 may be a mechanical button, but when the display 340 is a touchpad that detects a touch input, the input unit 360 may be formed integrally with the display 340.

A speaker 350 may output model information or an operation course list with a sound signal. For example, the input unit 360 receives an input that requests to output data with a sound, the control unit 310 may output model information or an operation course list with a sound signal using the speaker 350.

When the tag communication module 332 and the tag unit of the washing machine are tagged, the speaker 350 may output a sound signal. When the tag communication module 332 and the tag unit of the washing machine complete communication, the speaker 350 may output a sound signal notifying completion of communication.

The communication device 330 may include the tag communication module 332 that can perform NFC. When the tag communication module 332 is located within a predetermined distance from the tag unit of the washing machine, the tag communication module 332 may perform communication with the tag unit. The communication device 330 may receive model information from the tag unit.

The communication device 330 may further include an Internet module 334 that can communicate with an external server. The Internet module 334 connects to a server according to an Internet protocol to transmit and receive information. The Internet module 334 may request information about a plurality of operation courses or an operation course list corresponding to model information of the washing machine to the server. The operation course list may include information about a plurality of operation courses, but the operation course list is not limited thereto. The Internet module 334 may receive information about a plurality of operation courses or an operation course list corresponding to model information of the washing machine from the server. The operation course list may be a list of a plurality of operation courses, which are an operating method of the washing machine.

FIGS. 6 to 10 illustrate example operations of a washing machine control system.

Figure 6:
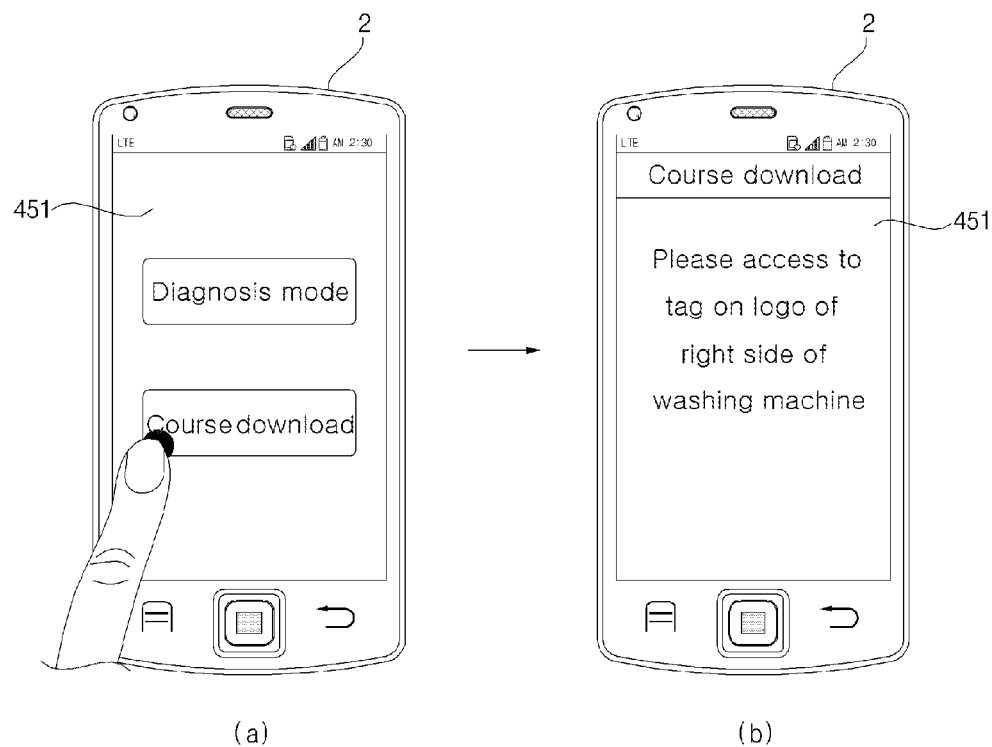
FIGS. 6 to 10 are diagrams illustrating operation of example washing machine control systems.

Referring to FIG. 6, the mobile device 2 may receive an input of a request for an operation course selection mode through the input unit. For example, when a display 451 is a touch screen that recognizes a touch input, the input unit may be included in the display 451, and FIGS. 6 to 10 illustrate the mobile device 2 including a touch screen.

When an operation course selection mode is selected, the mobile device 2 may display with the display 451 that the mobile device 2 should be tagged with the washing machine. In FIG. 6, an icon that selects an operation course selection mode is displayed with a message of course download. In some implementations, the content of a display message can be changed.

The user can view the display 451 that displays that the mobile device 2 should be tagged with the washing machine and detect that the mobile device 2 should be tagged with the tag unit of the washing machine.

Figure 7:
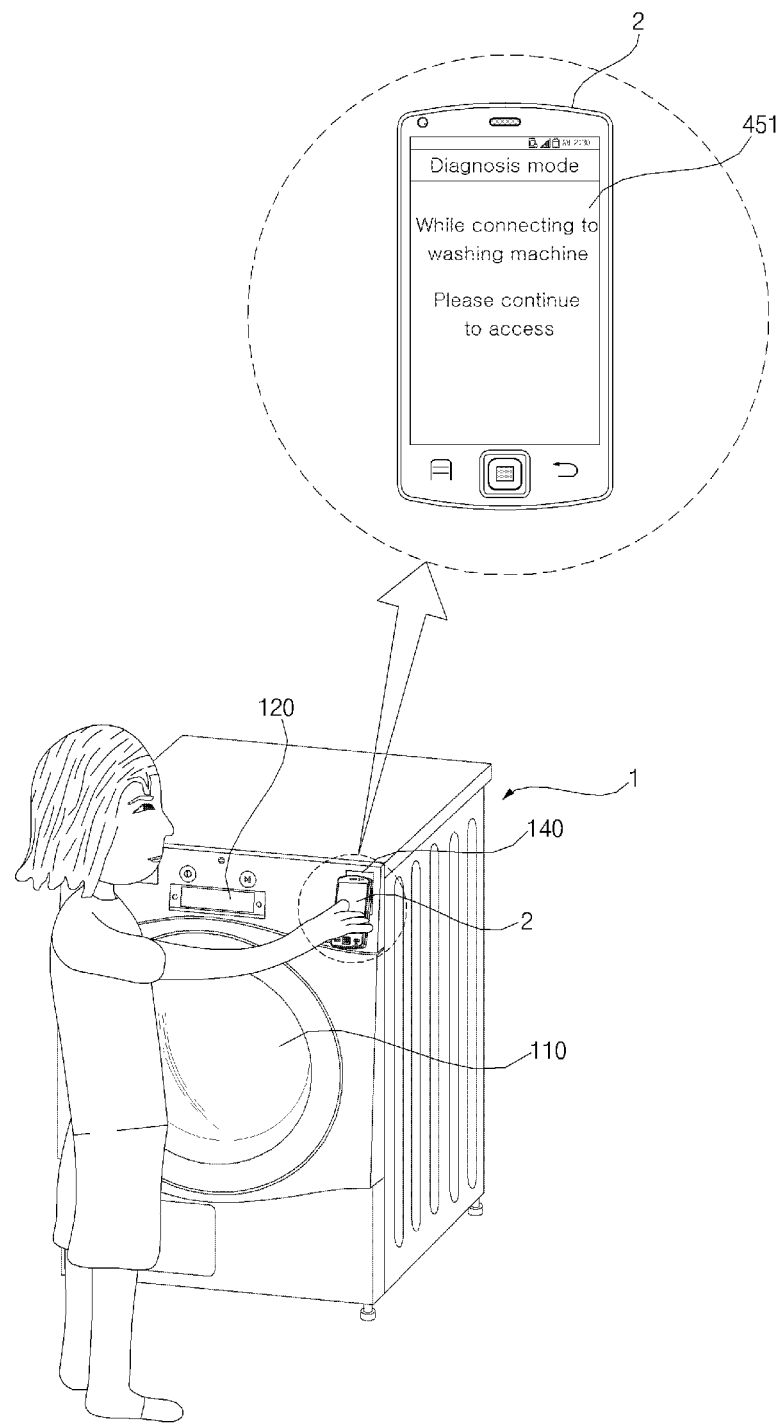

Referring to FIG. 7, the mobile device 2 and the tag unit 140 of the washing machine 1 may be tagged.

When the mobile device 2 and the tag unit 140 of the washing machine 1 are located within a predetermined distance, a communication device of the mobile device 2 and the tag unit 140 of the washing machine 1 may start communicating.

The tag unit 140 may transmit model information of the washing machine to the communication device of the mobile device 2. The model information may be included in a header of a packet along with any additional information. The tag unit 140 and the communication device of the mobile device 2 may perform communication for a predetermined time. While performing communication, in order to maintain a distance in which tagging is available, the display of the mobile device 2 may display that communication is performing.

A control unit of the mobile device 2 may receive model information and determine whether an operation course selection mode can be performed. When the washing machine is determined as a product that cannot perform an operation course selection mode from the received model information, the mobile device 2 may display in the display 451 that an operation course selection mode cannot be performed.

While the tag unit of the washing machine and the tag communication module of the mobile device are communicating, the mobile device 2 may enable the display 451 to continuously display information in which tagging should be maintained. By enabling the display 451 to continue to display information in which tagging should be maintained, reliability of NFC can be secured.

Figure 8:
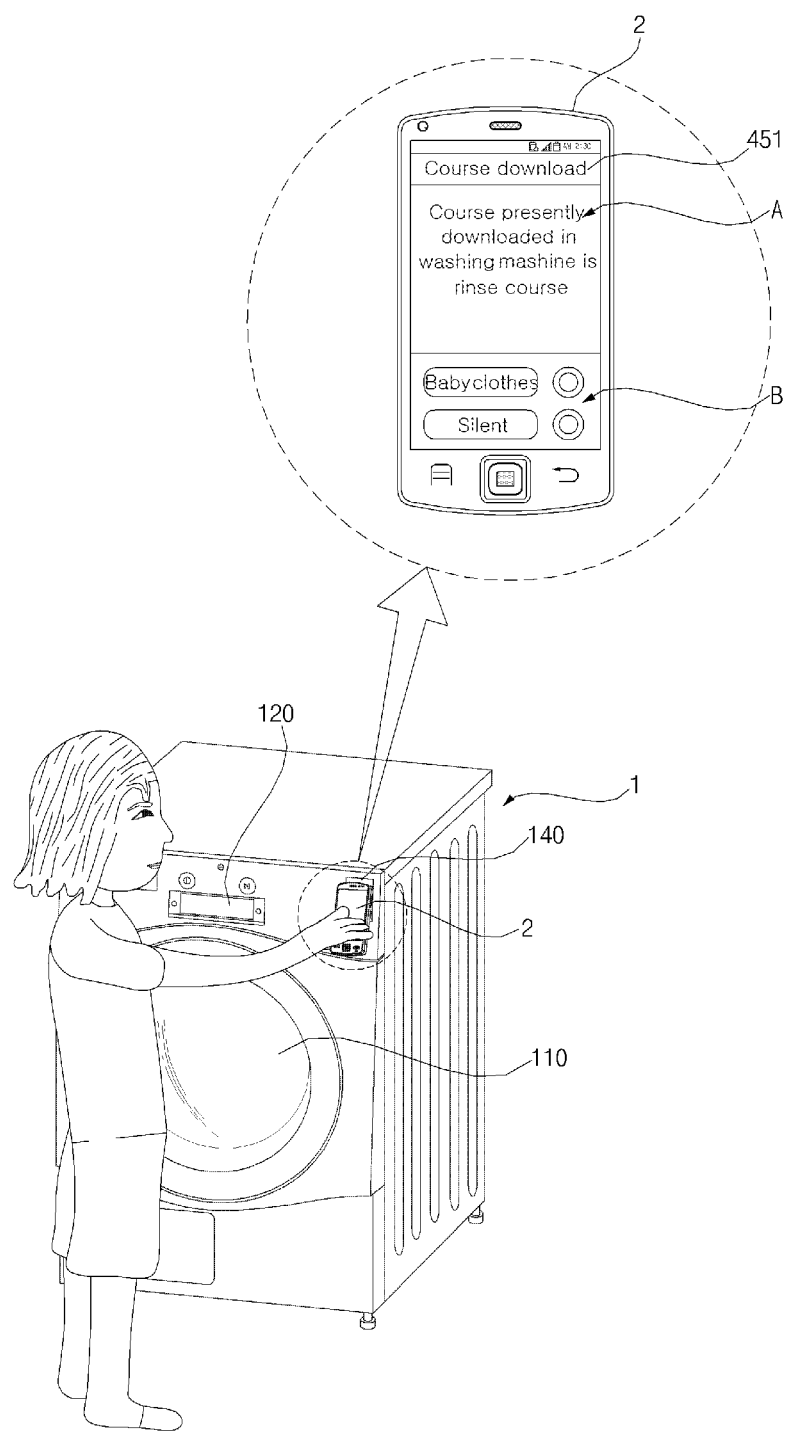

Referring to FIG. 8, when the mobile device 2 determines that an operation course selection mode can be performed based on model information, the Internet module may receive an operation course list from a server.

When the Internet module receives information about an operation course or an operation course list from the server, the mobile device 2 may enable the display 451 to display model information, information about an operation course, or an operation course list.

The display 451 may display a course presently downloaded in the washing machine (A). The model information may include at least one of a production company and a model name of the washing machine, a course presently downloaded in the washing machine, and information on whether the washing machine can communicate. The display 451 may display an operation course list and an icon that selects each of a plurality of operation courses included in the operation course list (B).

Figure 9:
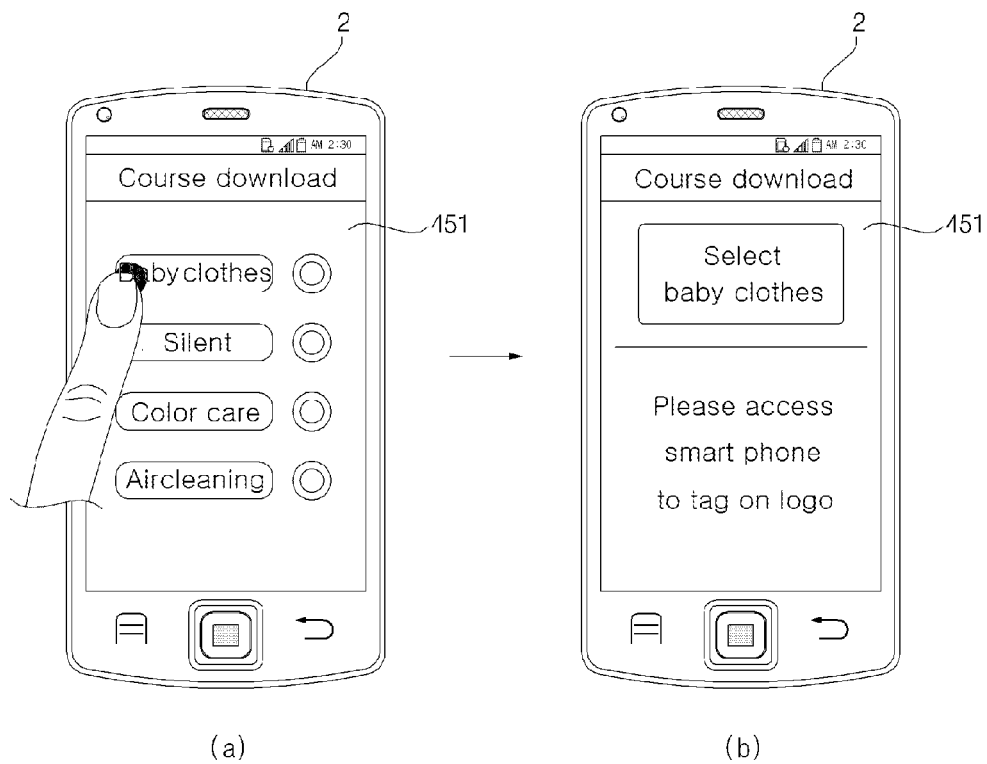

Referring to FIG. 9, the mobile device 2 may receive selection of at least one operation course from a user (a). When receiving selection of an operation course, the mobile device may display the selected operation course. When the operation course is selected, the mobile device 2 may display information that describes the selected operation course.

When an operation course is selected, the mobile device 2 may display that the mobile device 2 should be tagged with the tag unit of the washing machine (b). For example, the mobile device 2 may display a message of a content and a picture corresponding thereto, such as 'Please access a smart phone to a tag on logo' with the display 451.

Figure 10:
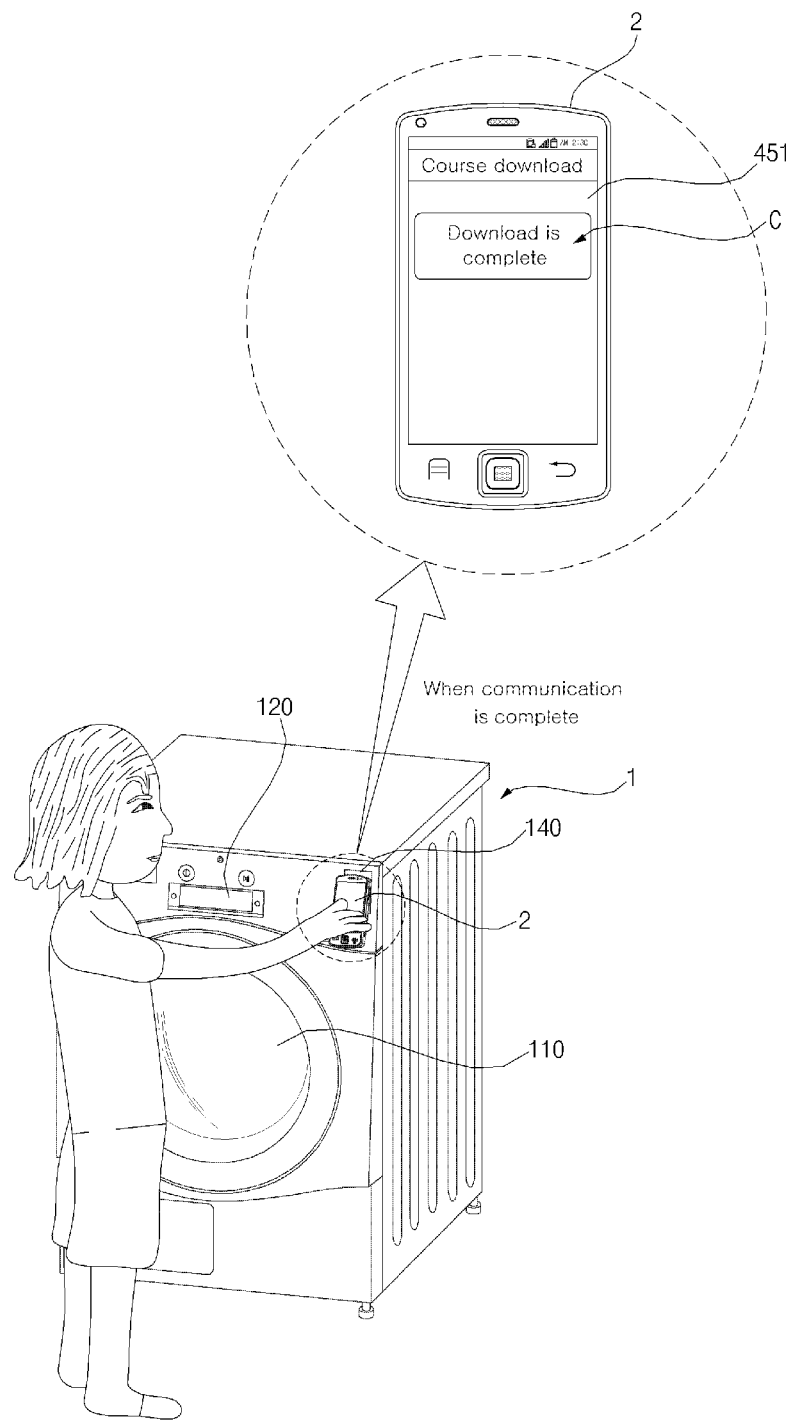

Referring to FIG. 10, when the mobile device 2 is tagged with the tag unit 140 of the washing machine in a state in which an operation course is selected, the mobile device 2 may transmit the selected operation course to the tag unit 140 of the washing machine 1.

The mobile device 2 may display information on whether communication is performing or whether communication has been normally complete with the display 451. For example, when communication has been normally complete, the mobile device 2 may display that communication has completed by displaying a message such as download completion. In some implementations, when communication has not been normally completed, the mobile device 2 may display information that requests to tag again.

When the washing machine 1 receives selected operation course information from the mobile device 2, the washing machine 1 may perform an operation to correspond to the received operation course information.

Figure 11:
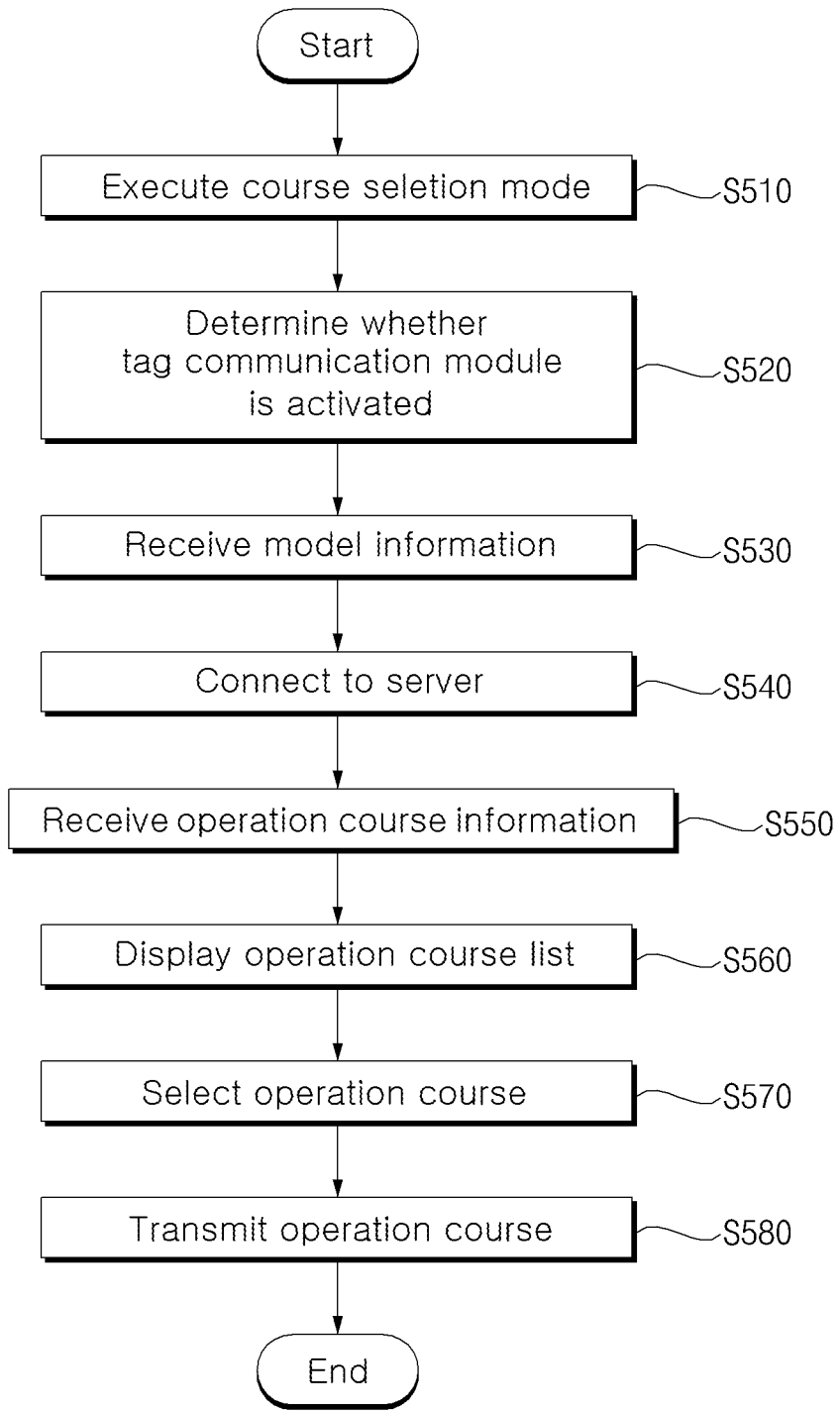
FIG. 11 is a flowchart illustrating an example method of controlling a washing machine control system.

FIG. 11 illustrates an example method of controlling a washing machine control system.

Referring to FIG. 11, a method of controlling a washing machine control system may include executing a course selection mode (S510), determining whether a tag communication module is activated (S520), receiving model information representing a model of the washing machine by tagging with the washing machine (S530), connecting to a server (S540), receiving information about a plurality of operation courses matched to model information from the server (S550), and displaying an operation course list including a plurality of operation courses (S560).

At executing a course selection mode (S510), the mobile device may receive an input of an instruction that instructs to execute an operation course selection mode from a user. When the mobile device receives an instruction that instructs to execute an operation course selection mode, the mobile device may activate a tag communication module of a communication device that can tag with the tag unit of the washing machine (S520).

When the tag communication module is not activated, the mobile device may display that NFC may not be performed and display information that requests to activate a communication device. When the tag communication module is activated, the mobile device may display information that requests tagging.

At receiving model information representing a model of the washing machine by tagging with the washing machine (S530), when the mobile device is located within a constant distance from the tag unit of the washing machine, the mobile device may perform communication with the tag unit. The mobile device may receive model information and store the model information at the storage unit. The model information may include at least one of a production company and a model name of the washing machine, a course presently downloaded in the washing machine, and information on whether the washing machine can communicate.

At receiving model information (S530), the mobile device may continue to display information in which communication is performing while model information is receiving. When model information is received, the mobile device may determine whether to receive an operation course list from the server based on model information.

At connecting to a server (S540), the mobile device may request information about an operation course or an operation course list matched to model information to the server. At receiving information about a plurality of operation courses matched to model information from the server (S550), the mobile device may receive information about an operation course or an operation course list matched to model information.

At displaying an operation course list (S560), the mobile device may display an operation course list. The mobile device may display a plurality of operation courses included in the operation course list and display an icon that can select each operation course.

In some implementations, a method of controlling a washing machine control system may further include selecting at least one of the plurality of operation courses (S570), transmitting the selected operation course to the washing machine (S580), and receiving an operation course selected by the washing machine and performing a washing operation to correspond to the received operation course. When one operation course of a plurality of operation courses is selected, the mobile device may request to tag with the tag unit of the washing machine.

When the operation course list is displayed, the user may select an operation course (S570). When the user selects an operation course, the mobile device may display the selected operation course. For example, the mobile device may display information that describes the operation course selected by the user. When the user selects an operation course, the mobile device may display information that requests to tag with the washing machine.

When the mobile device is tagged with the washing machine, the mobile device may transmit the selected operation course (S580). When the washing machine receives operation course information, the washing machine may display that the operation course information has been appropriately received. For example, the washing machine may output a visual signal and an audible signal, but an output means is not limited thereto.

The washing machine may receive information about the selected operation course. When the washing machine receives information about the selected operation course, the washing machine can perform a washing operation based on the received operation course.

Figure 12:
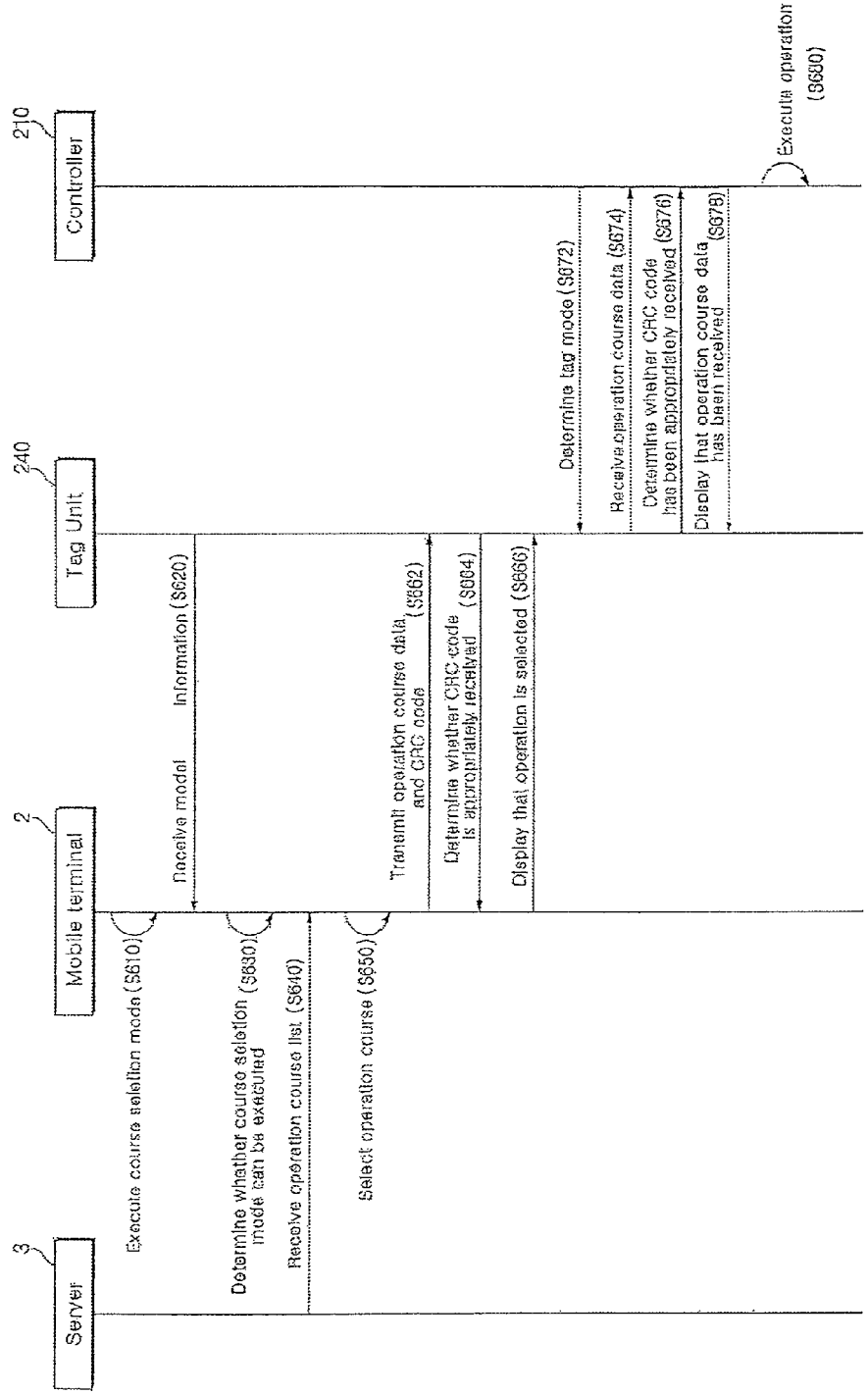
FIG. 12 is a message flow diagram illustrating an example communication process of a washing machine control system.

FIG. 12 illustrates an example communication process of a washing machine control system.

Referring to FIG. 12, a communication relationship between the controller 210 of the washing machine and the tag unit 240 and a communication relationship between the tag unit 240 and the mobile device 2 is illustrated.

The mobile device 2 may execute an operation course selection mode (S610). When the mobile device 2 executes an operation course selection mode, the mobile device 2 may display with the display that the mobile device 2 should be tagged with the washing machine.

When the mobile device 2 enters within a predetermined distance from the tag unit 240, the tag unit 240 may transmit model information to the mobile device 2 (S620). When the mobile device 2 receives data, the mobile device 2 may determine whether data has been appropriately received.

The mobile device 2 may determine whether an operation course selection mode can be executed based on model information (S630). The mobile device 2 may determine whether the washing machine is a product that can perform an operation course selection mode.

The mobile device 2 may request an operation course list corresponding to model information of the washing machine from the server 3. The mobile device 2 may receive an operation course list including information about an operation course corresponding to model information of the washing machine from the server 3 (S640).

The mobile device 2 may display an operation course list. The mobile device 2 may display to allow for selection at least one of a plurality of operation courses in which the operation course list includes. When an operation course is selected (S650), the mobile device 2 may display that the mobile device 2 should be tagged with the washing machine.

When the mobile device 2 is tagged with the tag unit 240 of the washing machine, the mobile device 2 may transmit operation course data and a CRC code (S662). When the tag unit 240 receives data, the mobile device 2 may determine whether the CRC code has been appropriately received (S664). When the mobile device 2 determines that an error does not occur in data in which the tag unit 240 receives, the mobile device 2 may leave data representing that operation course data has been transmitted in the tag unit 240 (S666).

When each data is transmitted and received, a process of determining whether an error occurs may be processed. In some implementations, the process may be a CRC method.

The controller 210 of the washing machine may determine a tag mode of the tag unit 240 (S672). For example, the controller 210 may determine whether the tag unit 240 is presently tagged with another external device and is communicating with another external device. When the tag unit 240 is not presently communicating with another external device, the controller 210 may receive operation course data from the tag unit 240 (S674).

When data is received, the controller 210 may determine whether a CRC code has been appropriately received (S676). If an error does not occur in data in which the tag unit 240 receives, the controller 210 may leave data representing that operation course data has been received in the tag unit 240 (S678).

The controller 210 of the washing machine may execute operation of the washing machine based on the received operation course data (S680).

Entire constituent elements may be implemented with one independent hardware, but some or the entire of constituent elements is selectively combined and may be implemented as a computer program having a program module that performs a partial function or an entire function combined in one hardware or a plurality of hardware.

A plurality of codes and code segments constituting a computer program may be stored in a computer readable medium, be read and executed by a computer. A recording medium of a computer program may include a magnetic recording medium, a light recording medium, and a carrier wave medium.

As described above, in a washing machine control system and a method of controlling the washing machine control system, because a mobile device can easily receive information of the washing machine using NFC, a using method can be intuitively provided to a user.

In a washing machine control system and a method of controlling the washing machine control system, a mobile device receives model information from a washing machine and determines whether operation of controlling an operation course can be performed, thereby improving reliability of information to be provided to a user.

In a washing machine control system and a method of controlling the washing machine control system, because a user can receive information about an operation course in which the washing machine can operate using the mobile device, the user can easily use the washing machine.

In a washing machine control system and a method of controlling the washing machine control system, as the mobile device or the washing machine outputs a signal that should maintain tagging or a signal in which tagging has been appropriately performed, the washing machine and the mobile device can appropriately exchange information.

In a washing machine control system and a method of controlling the washing machine control system, when an operation course is selected through a mobile device and the mobile device is tagged with a washing machine, the washing machine performs an operation course in which the user selects with the mobile device, thereby improving use convenience of the washing machine.

What is claimed is:

1. A washing machine control system, comprising:
a washing machine comprising:
   a tag unit comprising:
      a tag storage unit that stores model information; and
      a transmitting and receiving unit that transmits the model information based on a mobile device being tagged; and
a mobile device comprising:
   a tag communication module that receives the model information based on being tagged by the tag unit;
   an internet module that receives, from an external server via an internet protocol, information about a plurality of operation courses associated with the model information;
   a display that displays an operation course list comprising the plurality of operation courses;
   an input unit for selecting at least one of the plurality of operation courses in the operation course list; and
   a control unit that controls the tag communication module to transmit information about a selected operation course to the washing machine in response to the tag communication module being tagged with the tag unit,
wherein the washing machine is configured to perform an operation based on the received information about the selected operation course, and
wherein the operation course list is received from the external server based on the model information.

2. The washing machine control system of claim 1, wherein the control unit controls the display to display a request to tag the tag communication module with the tag unit in response to at least one of the plurality of operation courses being selected.

3. The washing machine control system of claim 1, wherein the washing machine further comprises an output device that outputs an indication that the information about the operation course has been received in response to the tag unit receiving information about the operation course.

4. The washing machine control system of claim 1, wherein the display displays a description of a selected operation course.

5. The washing machine control system of claim 1, wherein the mobile device further comprises a speaker that outputs a sound signal in response to the tag communication module being tagged by the tag unit.

6. The washing machine control system of claim 1, wherein the display displays an indication that the tag unit and the tag communication module are communicating.

7. The washing machine control system of claim 1, wherein the model information comprises at least one of a production company, a model name of the washing machine, or information on whether the washing machine is able to communicate.

8. The washing machine control system of claim 1, further comprising a controller that determines that information about an operation course has been stored at the tag storage unit based on the washing machine being turned on.

9. A method of controlling a washing machine control system on a mobile device, the method comprising:

executing, on the mobile device, a course selection mode for selecting an operation course of the washing machine;

determining that a tag communication module of the mobile device is activated;

receiving model information representing a model of a washing machine by tagging the washing machine in response to the tag communication module being tagged with a tag unit of the washing machine;

receiving, by an internet module and from an external server via an internet protocol, information about a plurality of operation courses associated with the model information;

displaying an operation course list comprising the plurality of operation courses;

receiving, by an input unit, a selection of at least one of the plurality of operation courses;

transmitting, to the washing machine, information about a selected operation course in response to the tag communication module being tagged with the tag unit; and performing a washing operation based on information about the selected operation by the washing machine, wherein the operation course list is received from the external server based on the model information.

10. The method of claim 9, further comprising:

displaying a request to tag the washing machine in response to the at least one of the plurality of operation courses being selected.

11. The method of claim 10, wherein receiving selection of the at least one of the plurality of operation courses comprises displaying a description of the selected operation course in response to the at least one of the plurality of operation courses being selected.

12. The method of claim 9, wherein receiving model information comprises displaying information about communicating while the model information is received.

13. The method of claim 9, wherein the model information comprises at least one of a production company, a model name of the washing machine, a course presently downloaded in the washing machine, or information on whether the washing machine is able to communicate.

* * * * *